US010693892B2

(12) United States Patent
Lee et al.

(10) Patent No.: US 10,693,892 B2
(45) Date of Patent: Jun. 23, 2020

(54) NETWORK ATTACK TAINTING AND TRACKING (71) Applicant: International Business Machines Corporation, Armonk, NY (US)

(72) Inventors: Cheng-ta Lee, Taipei (TW); Ronald B. Williams, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 226 days.

(21) Appl. No.: 15/837,426

(22) Filed: Dec. 11, 2017

(65) Prior Publication Data
US 2019/0182269 A1 Jun. 13, 2019

(51) Int. Cl.
*H04L 29/00* (2006.01)
*H04L 29/06* (2006.01)
*G06F 21/56* (2013.01)

(52) U.S. Cl.
CPC ........ *H04L 63/1416* (2013.01); *G06F 21/561* (2013.01); *H04L 63/0428* (2013.01); *H04L 63/123* (2013.01); *H04L 63/1466* (2013.01); *H04L 63/1491* (2013.01); *H04L 63/0281* (2013.01); *H04L 63/168* (2013.01)

(58) Field of Classification Search
CPC ............... G06F 21/561; H04L 63/1416; H04L 63/1466; H04L 63/0428; H04L 63/123; H04L 63/1491; H04L 63/168; H04L 63/0281
See application file for complete search history.

(56) References Cited

U.S. PATENT DOCUMENTS

| | | | |
|---|---|---|---|
| 6,826,694 B1* | 11/2004 | Dutta | H04L 63/0245 726/13 |
| 7,152,090 B2* | 12/2006 | Amirisetty | G06F 9/465 709/200 |
| 8,413,239 B2 | 4/2013 | Sutton et al. | |
| 9,191,298 B1* | 11/2015 | Bilby | H04L 41/046 |
| 9,286,148 B1* | 3/2016 | Arimilli | G06F 9/546 |
| 9,699,167 B1* | 7/2017 | Tovino | H04L 63/0807 |
| 10,044,716 B2* | 8/2018 | Hilliar | H04L 63/0428 |
| 10,412,098 B2* | 9/2019 | Campagna | H04L 9/3247 |
| 2005/0076227 A1 | 4/2005 | Kang et al. | |
| 2005/0246774 A1 | 11/2005 | Gunawardena | |
| 2007/0143619 A1* | 6/2007 | Goodman | G06F 21/606 713/176 |
| 2007/0157059 A1* | 7/2007 | Tsao | G01R 31/31855 714/733 |

(Continued)

OTHER PUBLICATIONS

National Institute of Standards and Technology (NIST); Advanced Encryption Standard (AES); Federal Information Processing Standards Publication (FIPS PUB) 197; Nov. 26, 2001.

(Continued)

*Primary Examiner* — Don G Zhao
(74) *Attorney, Agent, or Firm* — James L. Baudino (57) ABSTRACT

A technique for network attack tainting and tracking includes monitoring data packets received from a network for a malicious request. Responsive to detecting a malicious request, a payload is created that is digitally signed. The digitally signed payload is encrypted and injected into a response message, and the response message is then transmitted to a source of the request as a response to the request.

17 Claims, 8 Drawing Sheets

(56) References Cited

U.S. PATENT DOCUMENTS

| | | | |
|---|---|---|---|
| 2007/0220266 A1* | 9/2007 | Cooper | H04L 63/1416 713/176 |
| 2009/0300216 A1* | 12/2009 | Garcia | G06Q 10/00 709/245 |
| 2009/0313682 A1 | 12/2009 | Rajput et al. | |
| 2010/0133342 A1* | 6/2010 | Singh | G06F 21/32 235/439 |
| 2010/0251329 A1 | 9/2010 | Wei | |
| 2010/0293554 A1* | 11/2010 | Rastogi | G06F 9/44505 719/313 |
| 2011/0051614 A1* | 3/2011 | Li | H04L 63/0245 370/252 |
| 2011/0307540 A1* | 12/2011 | Martin | H04L 29/08792 709/203 |
| 2012/0159140 A1* | 6/2012 | Chang | H04L 63/068 713/2 |
| 2012/0159162 A1* | 6/2012 | Chang | H04L 9/3213 713/168 |
| 2012/0290830 A1* | 11/2012 | Resch | H04L 9/0841 713/150 |
| 2014/0047040 A1* | 2/2014 | Patiejunas | H04L 51/24 709/206 |
| 2014/0082695 A1* | 3/2014 | Alsina | H04L 29/06 726/3 |
| 2014/0129915 A1* | 5/2014 | Segal | G06F 11/3676 715/230 |
| 2014/0157405 A1 | 6/2014 | Joll et al. | |
| 2015/0081867 A1* | 3/2015 | Esdaile | H04L 61/6022 709/223 |
| 2015/0264082 A1* | 9/2015 | Belva | H04L 63/1466 726/25 |
| 2015/0288694 A1* | 10/2015 | Liebl | G06F 21/31 713/182 |
| 2016/0065337 A1* | 3/2016 | Atungsiri | H04L 27/2613 375/260 |
| 2016/0127395 A1 | 5/2016 | Underwood et al. | |
| 2016/0267558 A1* | 9/2016 | Bonnell | G06Q 30/0283 |
| 2016/0269185 A1* | 9/2016 | Stojanovski | H04L 9/3066 |
| 2017/0132633 A1* | 5/2017 | Whitehouse | G06Q 20/3274 |
| 2017/0140346 A1* | 5/2017 | Whitehouse | G06Q 20/3274 |
| 2017/0171174 A1* | 6/2017 | Campagna | H04L 63/0442 |
| 2017/0171219 A1* | 6/2017 | Campagna | H04L 63/123 |
| 2017/0193017 A1* | 7/2017 | Migliori | G06F 16/1724 |
| 2017/0201499 A1* | 7/2017 | McLaughlin | H04L 63/0428 |
| 2017/0201537 A1* | 7/2017 | Caldwell | H04J 3/0667 |
| 2017/0251025 A1* | 8/2017 | Varley | H04L 9/3247 |
| 2017/0255937 A1* | 9/2017 | Maddukuri | G06Q 20/4016 |
| 2017/0346807 A1* | 11/2017 | Blasi | H04L 63/0807 |
| 2018/0349602 A1* | 12/2018 | Johns | G06F 21/577 |
| 2018/0351923 A1* | 12/2018 | Rohel | G06F 21/6254 |
| 2018/0375663 A1* | 12/2018 | Le Saint | H04L 9/3247 |
| 2018/0375840 A1* | 12/2018 | Moy | H04L 9/3239 |
| 2019/0028445 A1* | 1/2019 | McLaughlin | H04W 12/001 |
| 2019/0108419 A1* | 4/2019 | Coven | G06N 20/00 |

OTHER PUBLICATIONS

National Institute of Standards and Technology (NIST); The Keyed-Hash Message Authentication Code (HMAC); Federal Information Processing Standards Publication (FIPS PUB) 198-1; Jul. 2008.

\* cited by examiner

HTTP_COOKIE = base64(
RSA_Sign(

"1: 10;2: 2013232;3: 9.10.11.12:443;4: 1.2.3.4:54323;5: www.ibm.com;6: IPR=3,50%,TW;7: 1487417089;8: +8;9: "WHERE account_owner_id = 0 OR 1=1", ibm.key)

) =

H2y/RSolgx/oiBj5dgBV+pIN0QMfM+/XVLqAp/LkQ1kW
+gUEW0+V36rnnEUBhpSxHmTAHOwbssmZhf7oiV4bfK1A4kQvkL5qEMUG
SPosmQOCFoRHtcq9cSwi4ygu5k4c2IuLsQTaMF9vr0qnKQI70+91
ElUav9P9fzgR2tCX9q9tpkB2UrrgrJz7leryhQfKq3kITUaBIAZiCnFeeSIA3cTpo
7WVMmzOQtO1
MHTD7PI41d6+cQN34oerQw/8xH48EP0OGscFDIV18ux5pLsgeHb
+X9GvruCS3Fz37/GZqDeZceMi
JtH0abYB
+20N4DZOJtTOPYWX59VFZu0Ke5v7SiKi54I1+aL6O4CC9RgTwdNOKLU/
IZHYrz8ZRUyQ
VeFg2b4N3JIaqDNQcDzjkVPHoNYrP+vm3RoR+k6KNkpQ7b8/
M1mHcM4AcbydQwu9HzYCPaabrYPLvQISv4A
+0zAp6K3FUHwjbVp5vH1PyIINZxi0nvsthdFN/kjxYZ4V68/
VAB8V1ci5w84muo6F2T1A
IXxXuyErBU2hEyZ1tiUiKCFR3zffS8sJTOHNgVv8HlvPngnx2UeDThkfehxbD
Q0NtguqstBTH1+Z
J5QeaC2H4edvWnXBz/
VgIFDA1HYGBDKHImeeIPZhhWxS9TKWZHRIU80wk+drSk8su2Jwwk
+rzAQ=

FIG. 6

HTTP/1.0 200 OK

Content-type: text/html

Set-Cookie: sToken=H2y/RSolgx/oiBj5dgBV+pIN0QMfM+/XVLqAp/LkQ1kW
+gUEW0+V36rnnEUBhpSxHmTAHOwbssmZhf7oiV4bfK1A4kQvkL5qEMUGSP
osmQOCFoRHtcq9cSwi4ygu5k4c2luLsQTaMF9vr0qnKQI70+91EIUav9P9fzgR
2tCX9q9tpkB2UrrgrJz7leryhQfKq3kITUaBIAZiCnFeeSIA3cTpo7WVMmzOQtO1
MHTD7PI41d6+cQN34oerQw8xH48EP0OGscFDIV18ux5pLsgeHb
+X9GvruCS3Fz37GZqDeZceMiJtH0abYB
+20N4DZOJtTOPYWX59VFZu0Ke5v7SiKi54I1+aL6O4CC9RgTwdNOKLUIZH
Yrz8ZRUyQVeFg2b4N3JIaqDNQcDzjkVPHoNYrP+vm3RoR
+k6KNkpQ7b8M1mHcM4AcbydQwu9HzYCPaabrYPLvQISv4A
+0zAp6K3FUHwjbVp5vH1PylINZxi0nvsthdFNkjxYZ4V68VAB8V1ci5w84muo6F
2T1AIXxXuyErBU2hEyZ1tiUiKCFR3zffS8sJTOHNgVv8HIvPngnx2UeDThkfehx
bDQ0NtguqstBTH1+ZJ5QeaC2H4edvWnXBz/
VglFDA1HYGBDKHImeelPZhhWxS9TKWZHRIU80wk+drSk8su2Jwwk+rzAQ=

Set-Cookie: Expires=Tue, 15 Jan 2030 00:00:00 GMT

NETWORK ATTACK TAINTING AND TRACKING

BACKGROUND

Organizations oftentimes deploy security operations to monitor network traffic, correlate traffic against threat indicators, and as a result, take action to block potential threats or create alerts on activity related to such threats. For example, an attack sequence may begin with a human actor launching a spam or phishing campaign designed to deceive a user into clicking on a particular network address or opening a potentially malicious file. Clicking on the file or link may result in the installation of malicious software designed to control the host machine. Once under control, the compromised host may engage in various malicious behaviors, including dissemination for phishing spam, scanning of internal and external networks for vulnerable hosts, ex-filtration of sensitive data from the internal net to the controller's infrastructure, deployment of ransomware, etc.

BRIEF SUMMARY

According to one aspect of the present disclosure a method and technique for network attack tainting and tracking is disclosed. The method includes monitoring data packets received from a network for a malicious request. Responsive to detecting a malicious request, a payload is created that is digitally signed. The digitally signed payload is injected into a response message, and the response message is then transmitted to a source of the request as a response to the request.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a method, system and computer program product for network attack tainting and tracking. Embodiments of the present disclosure are configured to detect a malicious network request or attack and craft a response appropriate to the communication protocol. A malicious request or attack may include any request or action that violates a security policy of a particular computing environment such that it is desirous to trace such action. Injected into a response message to a malicious request or action is a digitally signed, text encoded message that is likely to be stored on the malicious source system or host (e.g., a Hypertext Transfer Protocol (HTTP) cookie, a HTTP response, a Structured Query Language (SQL) response, a Transport Layer Security (TLS) session ticket, a file downloaded from a File Transfer Protocol (FTP) server, an email attachment, etc.) that provides a trace or audit trail for the request/attack. Therefore, direct evidence is available from the malicious source system or host that proves the communication occurred and that the specific host being examined was engaged in the communication. Moreover, as intervening network proxies may cache content, including responses, there remains a potential trail of evidence pointing to a specific machine at a particular time engaged in malicious access. Thus, for example, in some embodiments, the method and technique includes monitoring data packets received from a network for a malicious request. Responsive to detecting a malicious request, a payload is created that is digitally signed. The digitally signed payload is injected into a response message, and the response message is then transmitted to a source of the request as a response to the request.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
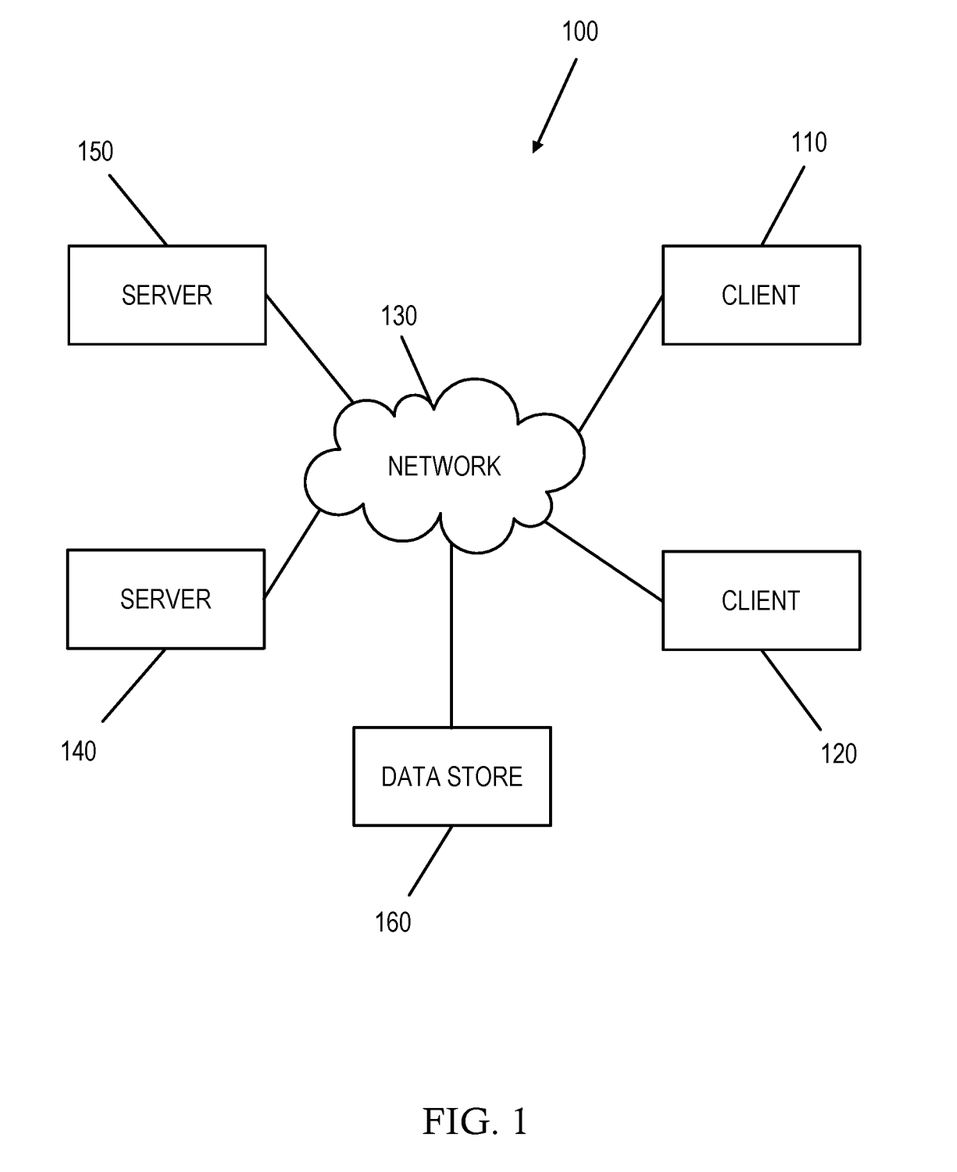
FIG. 1 is an embodiment of a network of data processing systems in which the illustrative embodiments of the present disclosure may be implemented.
Figure 2:
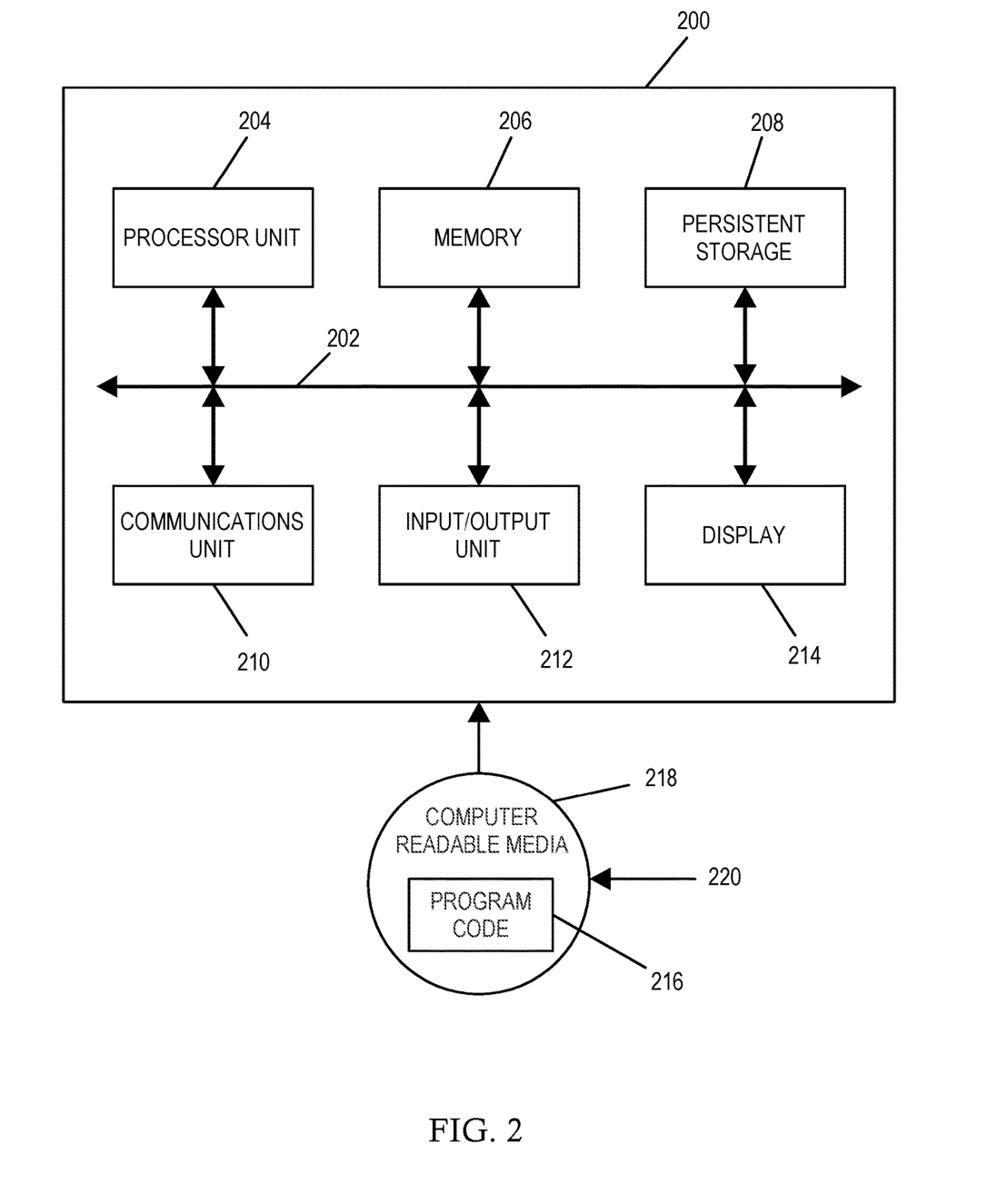
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for network attack tainting and tracking according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
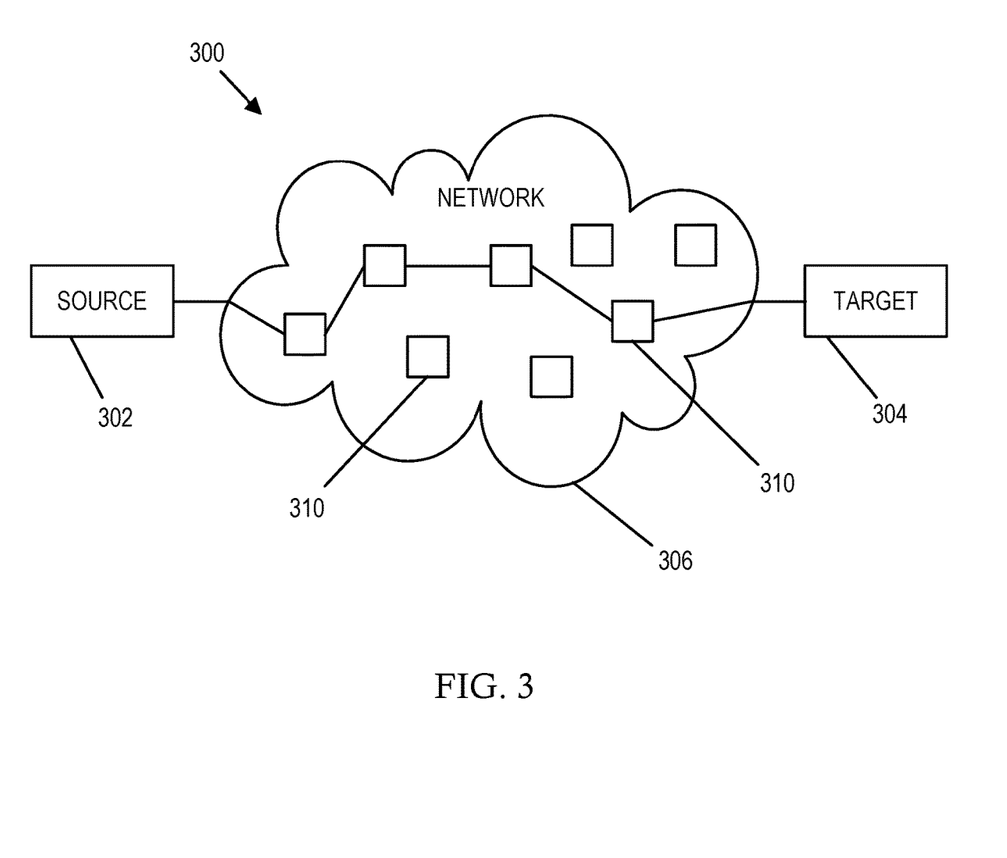
FIG. 3 is a diagram illustrating an embodiment of a computing network in which illustrative embodiments of a system for network attack tainting and tracking according to the present disclosure may be implemented.

FIG. 3 is a diagram illustrating an embodiment of a computing network 300 in which illustrative embodiments of a system, method, and computer program product for network attack tainting and tracking according to the present disclosure may be implemented. In FIG. 3, system 300 includes a source system or host 302, a target system or host 304, and a network 306 (e.g., such as the Internet). Source 302 and/or target 304 may comprise data processing systems or platforms such as, but not limited to, clients 110 and/or 120, servers 140 and/or 150, or other types of computing systems. Network 306 may include a number of nodes 310 that transmit a communication between source 302 and target 304 and/or that may be otherwise used by a malicious source 302 to implement a malicious process against target 304 (e.g., intervening network proxies, servers, routers, etc., that may cache content communicated therethrough). For example, source 302 (e.g., a client) may initiate and send a request directed to target 304 (e.g., in the form of a web server) such that data packets of the request migrate or travel through network 306 via one or more nodes 310 (e.g., network hops) to target 304. A response from target 304 to the request travels back to source 302 via network 306 via one or more nodes 310 (e.g., using a same or different route).

Figure 4:
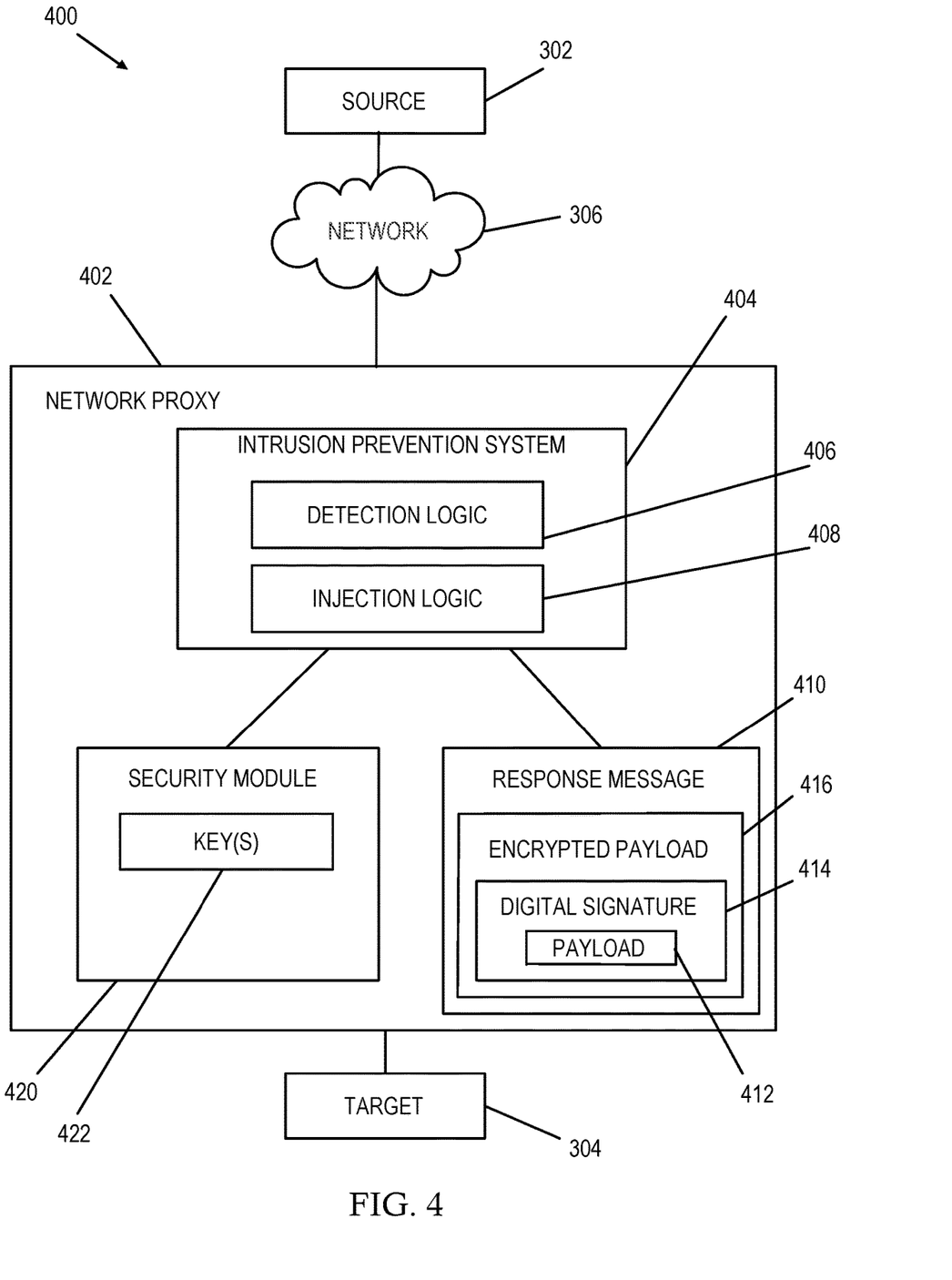
FIG. 4 is a diagram illustrating an embodiment of a system for network attack tainting and tracking according to the present disclosure may be implemented.

FIG. 4 is an illustrative embodiment of a system 400 for network attack tainting and tracking according to the present disclosure. In the embodiment illustrated in FIG. 4, system 400 includes source 302, target 304, network 306, and a network proxy 402. Network proxy 402 may comprise a standalone proxy server, be an application executing on target 304 (e.g., part of a firewall on a front-end of target 304, proxy, application gateway, etc.), or be another type of device otherwise configured to intercept network traffic destined for target 304 and monitor and/or scan such traffic for potential intrusions or malicious events. In the embodiment illustrated in FIG. 4, proxy 402 includes an intrusion prevention system (IPS) 404 having detection logic 406 and injection logic 408. Detection logic 406 may be used to monitor and/or scan ingress network traffic (e.g., data packets) destined for or directed to target 304 for potential intrusions or malicious events (e.g., based on rules, signatures, heuristics, etc.). As will be described in greater detail below, injection logic 408 is configured to gather various types of information related to a malicious event or intrusion, create a payload or token containing such information, digitally sign the payload/token, and inject the digitally signed payload/token into a response message to be communicated to source 302 as a response message to the source 302's request. Thus, in some embodiments, a network device/system located before target 304 (i.e., in an incoming path of network traffic) detects a malicious request and, instead of the request being processed by target 304 or passed through to target 304, the intermediary device/system creates a response message to the request. In the illustrated and described embodiment, IPS 404 detects the malicious request and prepares the response message. However, it should be understood that in some embodiments, the device/system creating the response message may reside as a separate device/system/logic apart from IPS 404 (e.g., separare logic invoked by IPS 404). Intrusion prevention system 404 (including detection logic 406 and/or injection logic 408) may be implemented in any suitable manner using known techniques that may be hardware-based, software-based, or some combination of both. For example, intrusion prevention system 404 (including detection logic 406 and/or injection logic 408) may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the embodiment illustrated in FIG. 4, a response message 410 is depicted as a response created by injection logic 408 to a malicious request or event detected by detection logic 406. In some embodiments, in response to detection logic 406 detecting a malicious event or request, injection logic 408 gathers various types of information related to the malicious request and uses such information to create a payload 412 that is communicated back to source 302 as the response 410 to the source 302's request. For example, payload 412 may include information associated with a time the malicious request was observed, the detection rule triggered (e.g., by detection logic 406, such as the signature that triggered an event or any artifact that provides information as to the basis of the triggered event) by the malicious request, and any observed properties of the malicious request. Such observed properties may include: an Internet Protocol (IP) address and/or port number of source 302; an IP address and/or port number of target 304; if a Hypertext Transfer Protocol (HTTP) request, a Uniform Resource Locator (URL) that was requested by source 302; a cryptographic hash of the malicious payload included in the request; header data read from the incoming packets; and/or other session information that may be useful in describing the context of the malicious request. Payload 412 is created and/or formatted appropriate to the protocol and application used in the attack (e.g., as an HTTP response to an HTTP request, an SQL response to an SQL request/query, etc.).

As illustrated in FIG. 4, injection logic 408 digitally signs payload 412 with a digital signature 414 to authenticate payload 412 as having been created by a particular sender/creator. For example, signature 414 may be that of an owner of target 304 or another entity (e.g., a certificate authority). In some embodiments, injection logic 408 may also encrypt the digitally signed payload 412 to create an encrypted, digitally signed payload 416. For example, in some embodiments, encrypting payload 412 may prevent the attacker/source 302 from identifying the content of a response message, thereby facilitating its storage on source 302's system/host. Encrypting payload 412 may also limit accessability to the content of payload 412 by the owner/controller of proxy 402 and/or IPS 404. However, it should be understood that, in some embodiments, encrypting payload 412 may be omitted. For example, if source 302's system detects a response message with an unfamiliar or a "special" format, source 302's system may attempt to block the connection. Thus, in some embodiments, the digitally signed payload 412 may remain unencrypted (e.g., plain text format), thereby also providing an audit trail for the attack. It should also be understood that other methods besides encryption could be used to obfuscate the content or payload 412 of the response message. For an embodiment including an encryption of the digitally signed payload 412, network proxy 402 may include a security module 420 (e.g., a key management system) having one or more keys 422 (e.g., a key store) that may be used to encrypt the digitally signed payload 412. Security module and its key(s) 422 may also be used to cryptographically hash the malicious payload included in the request from source 302 to include in payload 412. The encryption and/or hashing technique used may vary. Injection logic 408 formats the response message 410 containing the encrypted, digitally signed payload 416 to comply with the expected protocol and application type of the request received from source 302 (e.g., message 410 may be formatted as an HTTP response to an HTTP request, an SQL response to an SQL request/query, etc.). For example, response message 410 may comprise a string embedded in a Hypertext Markup Language (HTML) response over an HTTP protocol, a string embedded as HTTP cookie data, or an SQL response string as output from a database server. Example algorithms for creating an encrypted, digitally signed payload may include:

signed_payload=enc(payload, private_key)
encrypted_payload=AES(payload, key)
HMAC_payload=payload hash(payload|key)

where AES is the Advanced Encryption Standard using a symmetric-key block cipher algorithm as set forth in Federal Information Processing Standards Publication (FIPS PUB) 197, and HMAC is a Hash-based Message Authentication Code that makes use of a cryptographic key along with a hash function as described in FIPS PUB 198. In some embodiments, the created payload 412 and/or the digitally signed payload 412 may be stored and/or logged locally by proxy 402 to enable an investigator to identify a particular payload to search for when investigating a particular attack.

Figure 5:
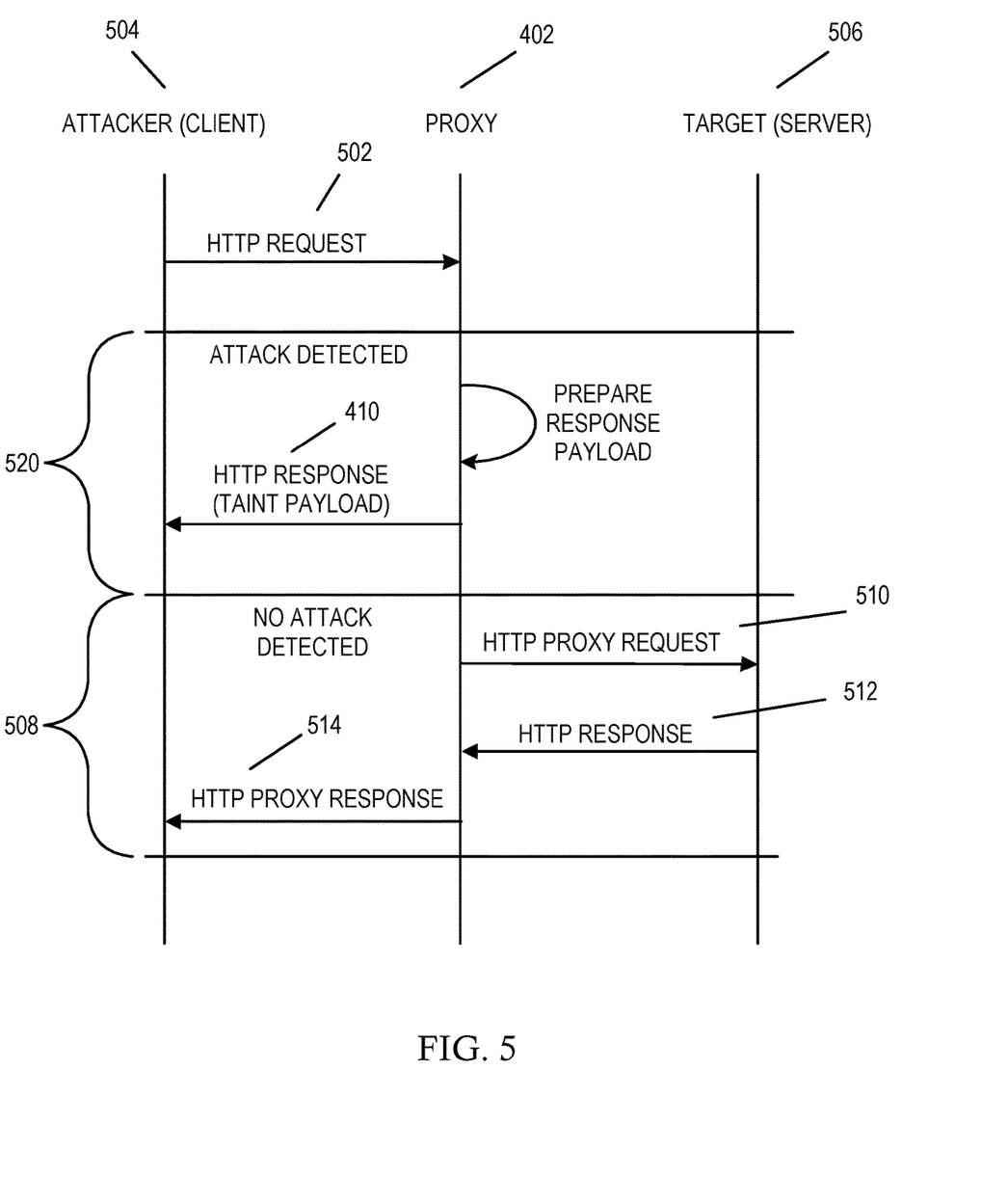
FIG. 5 is a diagram illustrating an embodiment of a network request-response sequence flow for network attack tainting and tracking according to the present disclosure.

FIG. 5 is a diagram illustrating an embodiment of a network request-response process for network attack tainting and tracking according to the present disclosure. As illustrated in FIG. 5, a message (in this example, in the form of an HTTP request 502) sent by an attacker 504 (e.g., a client or source 302) and intended for a target 506 (e.g. a server or target 304) is received by network proxy 402. Network proxy 402 determines if the data packets of the request 502 contain a malicious payload or otherwise indicate an attack event. If no attack is detected (indicated by 508), proxy 402 communicates an HTTP proxy request 510 to server target server 506 where server 506 responds to the request with an HTTP response 512. Proxy 402 receives the response 512 and forwards an HTTP proxy response 514 to the client 504. If, however, a malicious payload or attack event is detected by proxy 402 (indicated by 520), instead of forwarding the request 502 to server 506, proxy 402 creates a response payload 412 that is digitally signed and optionally encrypted (e.g., to form payload 416) and formatted according to an expected protocol (e.g., an HTTP response message 410). The message 410 containing the digitally signed payload 416 is transmitted by proxy 402 to client 504 as the response to the client 504's request 502. The connection between proxy 402 and client 504 (and between proxy 402 and server 506) may be reset.

Figure 6:
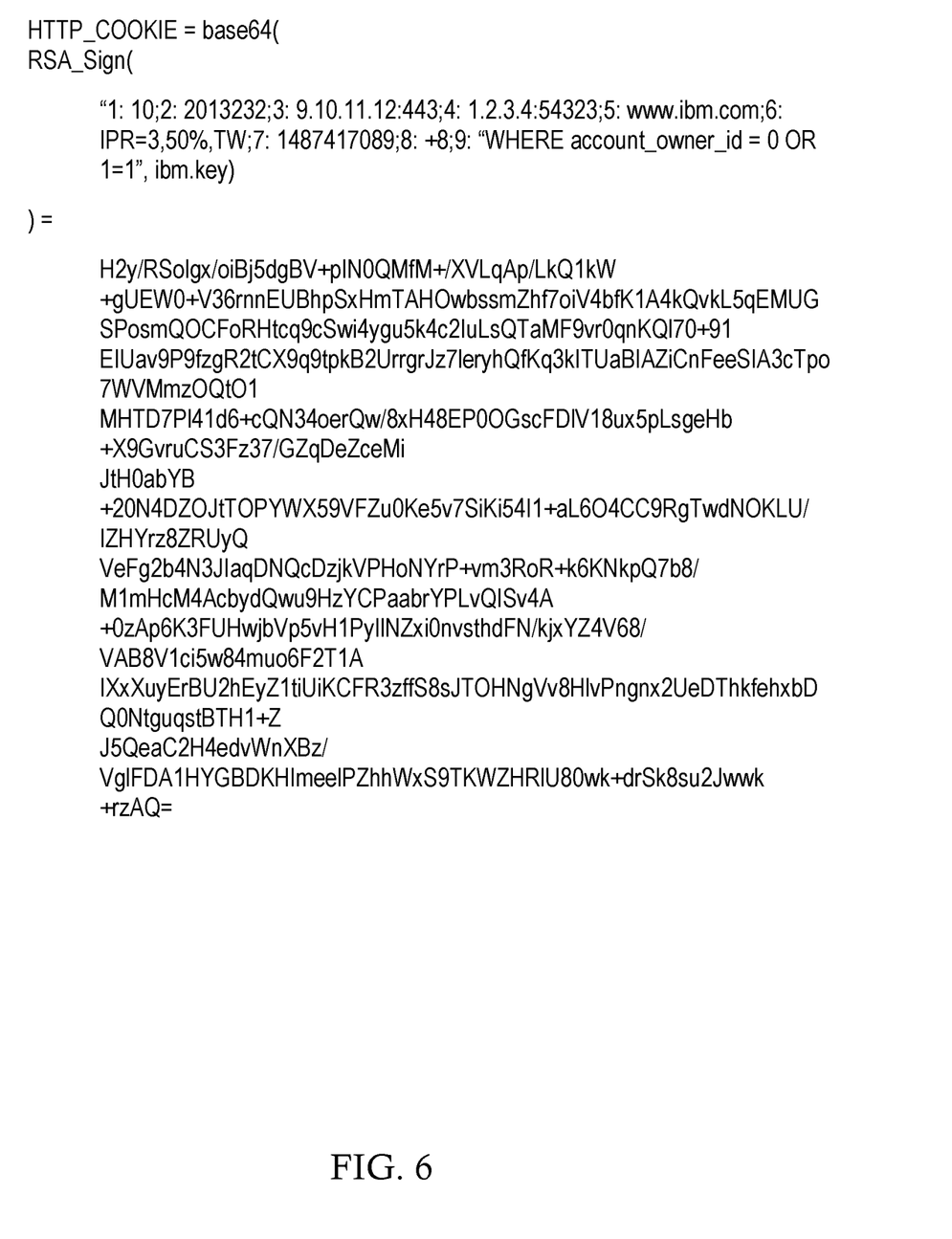
FIG. 6 is a diagram illustrating an embodiment of cookie created as a payload in a response message to a malicious network request according to the present disclosure.

An example of an encrypted, digitally signed payload 416 created in the form of an HTTP cookie to inject into the response message 410 is provided below. The payload 412 could be composed as a list of key-value pairs. The key could be a numeric identifier and the value could have its own format based on its type (e.g., the type of information, such as source IP address, target IP address, etc.). The original content gathered by injection logic 408 related to the malicious request for payload 412 could include the following:

Intrusion Category: SQL_INJECTION
IssueID: 2013232
Victim: 9.10.11.12:443
Intruder: 1.2.3.4:54323
Victim detail: www.ibm.com
Intruder detail: IPR=anonymous proxy,50%,Taiwan
Timestamp: 12:00 Feb. 18, 2017
Timezone: GMT+8
Attack Payload: "WHERE account_owner_id=0 OR 1=1"

The above-referenced content gathered by injection logic 408 could be transformed to an abbreviated version for its inclusion as payload 412:

"1": "10"
"2": "2013232"
"3": "9.10.11.12:443"
"4": "1.2.3.4:54323"
"5": "www.ibm.com"
"6": "IPR=3,50%,TW"
"7": "1487417089"
"8": "+8"
"9": "WHERE account_owner_id=0 OR 1=1"

Figure 7:
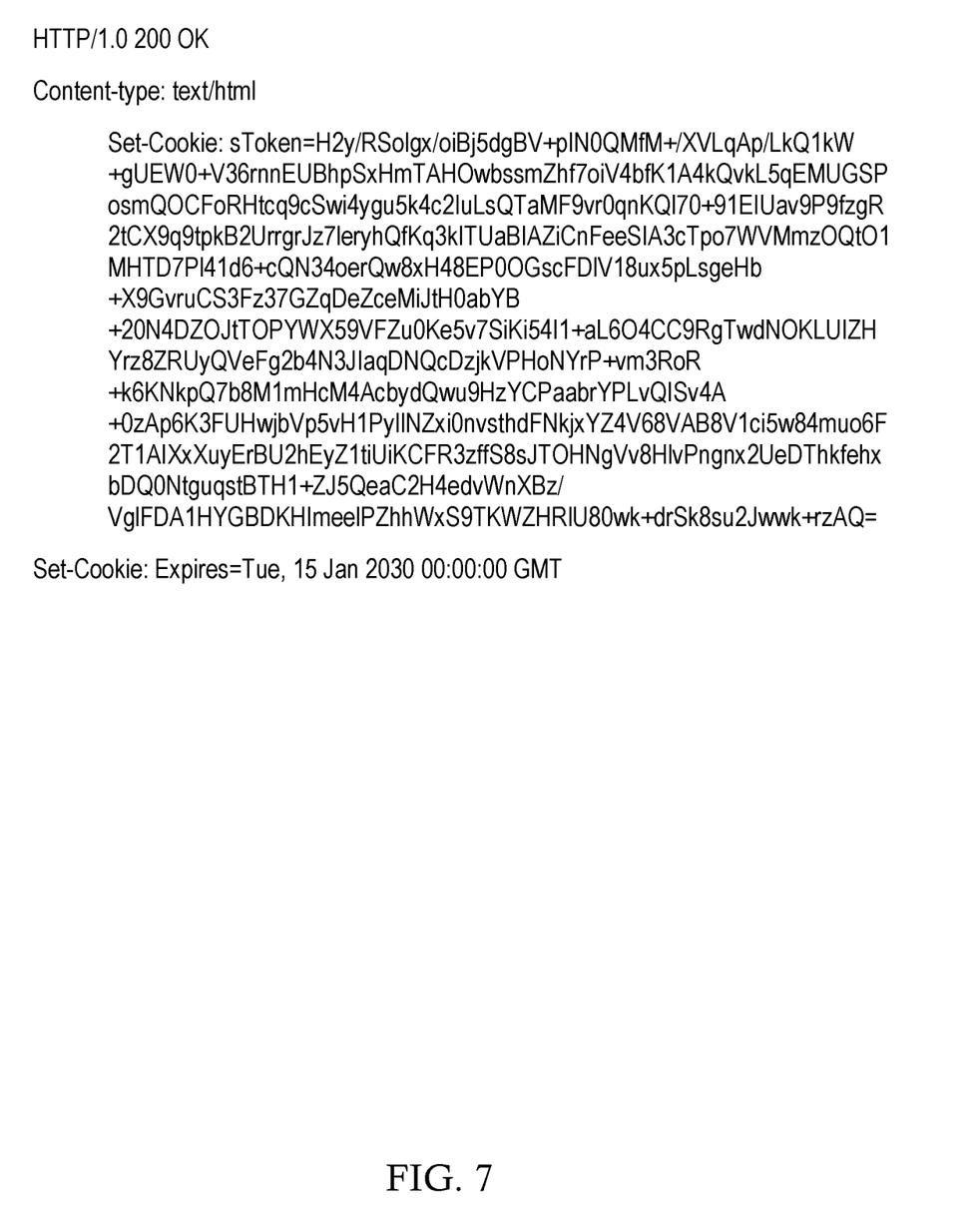
FIG. 7 is a diagram illustrating an embodiment of response message in the form of an HTTP response including the cookie of FIG. 6 to a malicious network request according to the present disclosure.

Each key-value pair can be concatenated with ";" and then digitally signed. To generate the cookie string, BASE64 could be used (or another method) to encode the digitally signed content. FIG. 6 is a diagram illustrating an embodiment of an encrypted, digitally signed payload 416 in the form of an HTTP cookie to a malicious network request according to the present disclosure based on the content described above, and FIG. 7 is a diagram illustrating an embodiment of response message 410 in the form of an HTTP response containing the encrypted, digitally signed cookie of FIG. 6 according to the present disclosure. As illustrated in FIG. 7, the expiration date of the cookie is set far into the future to increase the likelihood that the cookie will be stored on an attacker's browser. However, as described above, encrypting the digitally signed content of the response message is optional.

A user or administrator wanting to validate the signed cookie (e.g., of FIG. 6) can use the following process to obtain the context of a security incident:

1) Decode BASE64 content from "sToken" cookie;
2) Verify the signed content with public key and get the plain text file;
3) Restore the file content by looking up the key identifier and the corresponding value format;
4) The detail of a security incident is validated and restored;
5) Intrusion Category: SQL_INJECTION;
6) IssueID: 2013232;
7) Victim: 9.10.11.12:443;
8) Intruder: 1.2.3.4:54323;
9) Victim detail: www.ibm.com;
10) Intruder detail: IPR=anonymous proxy,50%,Taiwan;
11) Timestamp: 12:00 Feb. 18, 2017;
12) Timezone: GMT+8; and
13) Attack Payload: "WHERE account_owner_id=0 OR 1=1"

An example of source or pseudo-code of an HTTP response message (e.g., as depicted in FIGS. 6 and 7) is:

```
rawPayload = {
    timeStamp="<international d/t stamp>",
    srcIP="<attackersIP>",
    srcPORT="<attackerPort>",
    destIP="<targetIP>",
    destPORT="<targetPORT>",
    destURL="<targetURL>"
}
encPayload = encrypt(rawPayload, KDestServer);
sigPayload = digSig(encPayload, KDestServer);
cookieValue = base64(encPayload)+base64(sigPayload)*;
Set-Cookie2 = {
    SESSID: cookieValue,
    domain: "domain from target host",
    path: "/",
    expires: "Never",
    HTTP: "true",
    secure: "false"
}
```

In some embodiments, the digital signature can be dropped if there is a cookie size limit (e.g., greater than 4K), or additional cookies can be used. Another example of injecting a digitally signed payload is associated with a Secure Sockets Layer (SSL)/TLS connection. For example, a session ticket returned from a server to a client could be used to store the signed payload. In an FTP application, the file downloaded from the server could be replaced with a signed file as the response payload. The metadata of each file type may also be modified to secretly inject therein the signed payload.

Thus, in operation, in response to detecting a malicious request made by a client or source 302 (e.g., via detection logic 406 of IPS 404), injection logic 408 crafts a response appropriate to the communication protocol and injects into that response a digitally signed, encrypted, and text encoded message in a way that is likely to be stored on the malicious source 302's system. server host. Injection logic 408 may gather various types of information associated with the malicious attack (e.g., source and/or target IP address, time of the attack, content on the incoming payload, etc.) and create payload 412. Payload 412 is then digitally signed (e.g., via digital signature 414) to authenticate the creator of payload 412, and the digitally signed payload 412 is encrypted. The encrypted, digitally signed payload 416 is then formatted to the appropriate communication protocol as response message 410 and transmitted to source 302 as a response to the source 302's request.

Embodiments of the present disclosure provide stored data on the malicious client host/source 302 as evidence of the communication that occurred and that the specific host being examined was engaged in the communication. Moreover, as intervening network proxies/devices/nodes 310 may cache content (including responses), there remains a potential trail of evidence all pointing to a specific machine at a particular time engaged in malicious access. Encrypting the data/payload 412 enables saving the observed indicators in the payload accessible only to the organization controlling the network intrusion detection device (e.g., proxy 402). Digital signing the data/payload authenticates the targeted organization/entity as the source of the payload. Text encoding (i.e. ASCII, Base 64, Unicode, etc.) enables the payload to be rendered as text and thereby be stored by specific service applications and or logs. While the example implementations above illustrate the invention working with HTTP, similar methods could be used with any network protocol. Embodiments of the present disclosure provide a forensic token to propagate across proxy servers and clients. Sending back the payload to an HTTP agent (client) increases the probability that it will be stored on the client/attacker's machine and may be captured by intervening HTTP proxy servers.

Thus, as part of security operations, forensics analysis is focused on developing empirical evidence indicating malicious behavior. Such analysis comprises collecting and correlating different types of data to: 1) prove the behavior malicious; 2) understand and describe textually and/or graphically the nature of malicious behavior; and 3) develop legally admissible evidence of such behavior which may include human actors, various networked computing device(s), and information flows related to observed behavior. The forensic challenge is to correlate various kinds of information, including: 1) file transfers and communications between host and malicious IP addresses or URLs; 2) host indicators of compromise (files, file hashes, registry keys, configuration file changes, etc.); 3) communications between known compromised hosts and other systems; 4) owners of malicious domains (names, email addresses, physical addresses, telephone numbers, etc.); and 5) known campaigns involving malicious domain owners and internet accessible resources (IP's, URLs). First order artifacts used for forensics analysis may comprise: 1) network and host artifacts, email messages, chat messages, host resident files; 2) internet browser history and caches, and host application generated files; 3) log files and alert streams from network firewalls, intrusion protection systems, host systems, monitoring systems, and aggregation systems (security event and information monitors, etc.); 4) user registries (email, enterprise authentication system, application and infrastructure access systems); and 5) DNS registrar information. Second order artifacts may include various types and source of Internet threat intelligence (e.g., IP reputation, URL reputation, application reputation, security information and event management (SIEM) correlation alerts, and file analysis reports (malware analysis).

Accordingly, embodiments of the present disclosure facilitate the storage, collection, aggregation, comparison, and analysis of forensic tokens stored on malicious client host/source 302 as well as intervening network proxies/devices/nodes 310. For example, should the client host/source 302 become available, as in the case of government approved investigation, site take down, or equipment seizure, log and data files can be examined to identify positive correlation to the observed attacks. Thus, if a malicious client/source 302 makes a request of a protected server host/target 304, the inline traffic inspection (IPS 404) alerts on the request traffic from the client (based on rules, signatures, heuristics). At the point of detection, a forensic payload is returned to the requesting client. Depending on the configuration of any intermediate proxy servers, a network trace will reveal the presence of the forensic token. The token can also be searched for using token format rules.

Figure 8:
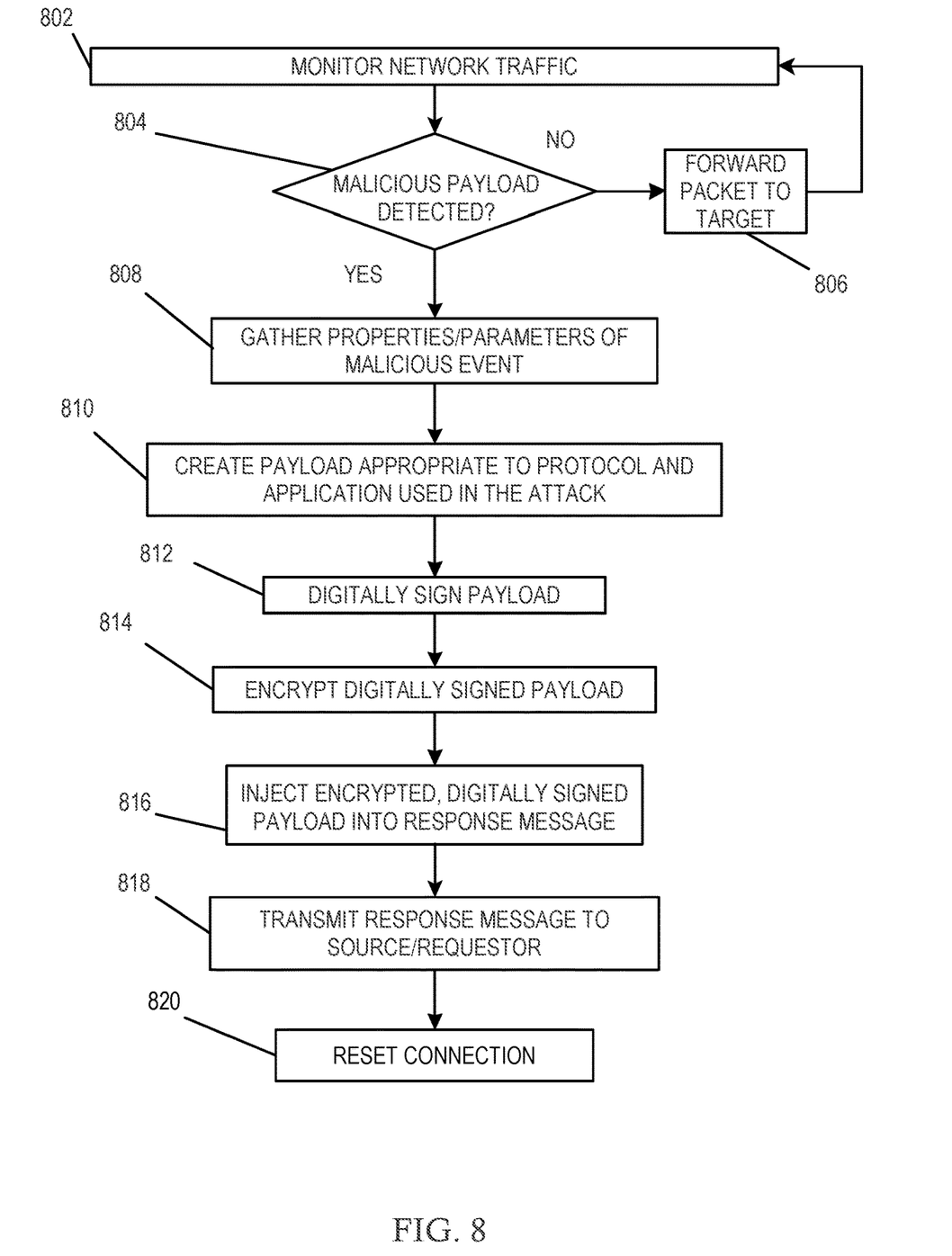
FIG. 8 is a flow diagram illustrating an embodiment of a method for network attack tainting and tracking according to the present disclosure.

FIG. 8 is a flow diagram illustrating an embodiment of a method for network attack tainting and tracking according to the present disclosure. The method begins at block 802, where network proxy 402 (e.g., via IPS 404) monitors network traffic destined for target host/server 304. At decisional block 804, a determination is made whether a received request contains a malicious payload. If not, the method proceeds to block 806, where network proxy 402 forwards the packet(s)/request to the target host/server 304 for processing/responding in the ordinary course, and IPS 404 continues to monitor network traffic. If at decisional block 804 a determination is made that a received request contains a malicious payload, the method proceeds from block 804 to block 806, where IPS 404 (e.g., via injection logic 408) gathers various properties/parameters/information associated with the malicious request (e.g., time of the request, source and destination IP addresses, rule that triggered the attack detection, etc.). At block 810, IPS 404 creates payload 412 using the gathered information appropriate to the protocol and application used in the attack (e.g., a cookie based on an HTTP request received from a browser, an SQL response to an SQL query, etc.).

At block 812, payload 412 is digitally signed (e.g., with digital signature 414 corresponding to the creator of payload 412). At block 814, the digitally signed payload 412 is encrypted. However, it should be understood that in some embodiments, encryption of the digitally signed payload 412 may be omitted. At block 816, the encrypted, digitally signed payload 416 is injected into a response message 410 to the request (e.g., an HTTP response). At block 818, network proxy 402 transmits the response message 410 to the client/source 302 of the request as a response to the request. At block 820, the connection to client/source 302 is reset.

Thus, as indicated above, embodiments of the present disclosure are configured to detect a malicious network request and craft a response appropriate to the communication protocol. Injected into that response is a digitally signed, encrypted, and text encoded message that is likely to be stored on the malicious source system or host (e.g., an HTTP cookie, a HTTP response, a SQL response, etc.). Therefore, direct evidence is available from the malicious source system or host that proves the communication occurred and that the specific host being examined was engaged in the communication. Moreover, as intervening network proxies may cache content, including responses, there remains a potential trail of evidence pointing to a specific machine at a particular time engaged in malicious access.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
   monitoring, by a network device, data packets destined for a target for a malicious request; and
   responsive to detecting the malicious request:
   creating by the network device a payload;
   formatting the payload to correspond to a protocol of the request;
   digitally signing the payload;
   injecting the digitally signed payload into a response message; and
   transmitting the response message to a source of the request as a response to the request.

2. The method of claim 1, further comprising encrypting the digitally signed payload.

3. The method of claim 1, wherein creating the payload includes forming the payload to include a detection rule triggered by the malicious request.

4. The method of claim 1, wherein creating the payload includes forming the payload to include an Internet Protocol (IP) address of the source of the malicious request.

5. The method of claim 1, wherein injecting the digitally signed payload into the response message includes injecting the digitally signed payload into a cookie.

6. The method of claim 1, wherein creating the payload includes forming the payload to include an IP address of a target of the malicious request.

7. A system, comprising:
   a processor and a memory; and
   an intrusion prevention system executable by the processor to:
   monitor data packets received from a network for a malicious request; and
   responsive to detecting the malicious request:
   create a payload;
   format the payload to correspond to an expected protocol of the request;
   digitally sign the payload;
   inject the digitally signed payload into a response message; and
   transmit the response message to a source of the request as a response to the request.

8. The system of claim 7, wherein the intrusion prevention system is executable to encrypt the digitally signed payload.

9. The system of claim 7, wherein the intrusion prevention system is executable to create the payload to include a detection rule triggered by the malicious request.

10. The system of claim 7, wherein the intrusion prevention system is executable to create the payload to include an Internet Protocol (IP) address of the source of the malicious request.

11. The system of claim 7, wherein the intrusion prevention system is executable to inject the digitally signed payload into a cookie.

12. The system of claim 7, wherein the intrusion prevention system is executable to create the payload to include an IP address of a target of the malicious request.

13. A computer program product for network attack tainting and tracking, the computer program product comprising a computer readable storage medium having program instructions embodied therewith, the program instructions executable by a processor to cause the processor to:
   monitor data packets received from a network by a network device for a malicious request, the data packets destined for a target; and
   responsive to detecting the malicious request:
   create by the network device a payload;
   format the payload to correspond to an expected protocol of the request;
   digitally sign the payload;
   inject the encrypted digitally signed payload into a response message; and
   transmit the response message to a source of the request as a response to the request.

14. The computer program product of claim 13, wherein the program instructions are executable by the processor to encrypt the digitally signed payload.

15. The computer program product of claim 13, wherein the program instructions are executable by the processor to create the payload to include a detection rule triggered by the malicious request.

16. The computer program product of claim 15, wherein the program instructions are executable by the processor to create the payload to include an Internet Protocol (IP) address of the source of the malicious request and a target of the malicious request.

17. The computer program product of claim 13, wherein the program instructions are executable by the processor to inject the digitally signed payload into a cookie.

* * * * *